US008091471B2

(12) United States Patent
Larsen

(10) Patent No.: US 8,091,471 B2
(45) Date of Patent: Jan. 10, 2012

(54) AUTOMATED PRODUCTION PROCESSES AND ASSOCIATED SYSTEMS, INCLUDING AUTOMATED BREAD MAKING PROCESSES

(76) Inventor: Herbert A. F. Larsen, Abbotsford (CA)

( * ) Notice: Subject to any disclaimer, the term of this patent is extended or adjusted under 35 U.S.C. 154(b) by 1414 days.

(21) Appl. No.: 11/403,642

(22) Filed: Apr. 13, 2006

(65) Prior Publication Data

US 2007/0242559 A1   Oct. 18, 2007

Related U.S. Application Data

(60) Provisional application No. 60/672,023, filed on Apr. 18, 2005.

(51) Int. Cl.
*B01F 15/06*   (2006.01)

(52) U.S. Cl. ............. 99/357; 99/470; 99/477; 99/353; 99/355; 99/356; 219/388; 366/144

(58) Field of Classification Search .......... 099/352–355, 099/339, 340, 386, 326–333, 443 R, 371, 099/360–367, 444–450, 467–479, 443 C, 099/348; 219/388, 400; 126/21 A, 12 A; 432/142, 152; 426/523; 118/16; 425/91
See application file for complete search history.

(56) References Cited

U.S. PATENT DOCUMENTS

| | | | | |
|---|---|---|---|---|
| 2,897,772 A | * | 8/1959 | Hunter | 99/352 |
| 2,930,310 A | * | 3/1960 | Poppenburg | 99/476 |
| 2,953,460 A | * | 9/1960 | Baker | 426/19 |
| 3,385,204 A | * | 5/1968 | Richardson | 99/404 |
| 3,882,768 A | * | 5/1975 | Troisi et al. | 99/352 |
| 4,028,024 A | * | 6/1977 | Moreland | 425/133.1 |
| 4,514,167 A | * | 4/1985 | Royer | 432/11 |
| 4,517,447 A | * | 5/1985 | Hicks | 219/388 |
| 4,882,981 A | * | 11/1989 | Bacigalupe et al. | 99/479 |
| 5,103,719 A | | 4/1992 | Mani | |
| 5,109,758 A | * | 5/1992 | Voegtlin | 99/443 C |
| 5,404,796 A | * | 4/1995 | Campbell et al. | 99/357 |
| 5,458,415 A | | 10/1995 | Poilane et al. | |
| 5,479,850 A | * | 1/1996 | Anderson | 99/357 |
| 5,538,414 A | * | 7/1996 | Kobayashi et al. | 425/321 |
| 5,605,708 A | * | 2/1997 | Cummins et al. | 425/332 |
| 6,065,392 A | * | 5/2000 | Florindez | 99/353 |
| 6,361,307 B1 | | 3/2002 | Bernhard et al. | |
| 6,450,086 B1 | | 9/2002 | Martinez Ruiz et al. | |

FOREIGN PATENT DOCUMENTS

WO   WO 2006113446 A1 *  10/2006

* cited by examiner

*Primary Examiner* — Henry Yuen
*Assistant Examiner* — Jianying Atkisson
(74) *Attorney, Agent, or Firm* — Perkins Coie LLP

(57) ABSTRACT

Aspects of the present invention relates to automated production processes and associated systems, including automated bread making processes which enable the continuous production of baked bread. One aspect of the invention is directed toward a system for the continuous production of baked bread that includes an ingredient metering unit, a dough mixing unit coupled to the ingredient metering unit, a dough transport coupled to the dough mixing unit, an endless oven conveyor having a plurality of dough holders spaced apart from each other, and an oven unit coupled to the oven conveyor. The oven conveyor is configured to move the dough holders through the baking portion at a rate so the single batches of dough in the dough holders will be sequentially baked to form the baked products when the dough holder exit the oven unit.

18 Claims, 10 Drawing Sheets

AUTOMATED PRODUCTION PROCESSES AND ASSOCIATED SYSTEMS, INCLUDING AUTOMATED BREAD MAKING PROCESSES

CROSS REFERENCE TO RELATED APPLICATIONS

This patent application claims priority to U.S. Provisional Patent Application No. 60/672,023, entitled "Continuous Production of Baked Bread", filed Apr. 18, 2005, which is incorporated herein in its entirety by reference thereto.

TECHNICAL FIELD

The present invention relates to automated production processes and associated systems, including automated bread making processes which enable the continuous production of baked bread. Although not limited, certain embodiments of the present invention are considered especially suitable for use in retail outlets such as stores, supermarkets, retail bakeries and other places where there is a demand for significant amounts of fresh baked product, but not on an industrial scale as in the case of wholesale bakeries which may supply many retail outlets.

BACKGROUND

Bread making machines and equipment range in size from small household appliances limited to producing a few loaves of bread at a time to massive automated systems for the continuous production of baked bread on an industrial scale. The latter are suited for the service of wholesale markets and have a capacity which is far beyond the demands of any single retail outlet. Conversely, the capacity of household appliances falls far short of such demands. Thus, retailers who want to offer fresh baked bread for sale normally will do so using conventional commercial dough mixing machines, baking machines, proofing chambers, and other equipment. Each piece of equipment often stands alone from the others. Collectively, the equipment can have a relatively large "footprint" occupying a significant amount of floor space. As well, the process of making bread using such equipment can be relatively labor intensive and require manual intervention as the product is moved from one stage of production to the next. Consequently, the cost of production is increased.

For the foregoing reasons, there is a need for an improved integrated system and components which enable the automated continuous production of baked products, which has a relatively small "footprint", and which has the capacity to meet customer demands at a typical retail outlet.

SUMMARY

Aspects of the present invention are directed toward automated production processes and associated systems, including automated bread making processes which enable the continuous production of baked bread. One aspect of the present invention is directed toward a system for the continuous production of baked product. The system comprises an ingredient metering unit having a measuring portion and a first outlet for discharging a succession of metered volumes of ingredients. Each volume of ingredient is used for the production of a batch of dough for a single unit of the baked product. A dough mixing unit is coupled to the ingredient metering unit and has a mixing chamber and a mixing device in the mixing chamber. The mixing chamber is in communication with at least the first outlet. The mixing device is configured to mix the volume of ingredients to form a batch of dough for the single unit of baked product.

A dough transport is coupled to the dough mixing unit and positioned to receive a succession of the batches of dough discharged from the dough mixing unit is operative to transport the single batches of dough to a discharge portion. An endless oven conveyor has a plurality of dough holders spaced apart from each other. Each dough holder is configured to contain a single batch of dough. The oven conveyor has a portion adjacent to the discharge portion of the dough transport and is configured to sequentially move the dough holders through a position to receive a single batch of dough from the discharge portion of the dough transport. An oven unit is coupled to the oven conveyor and has an oven inlet, an oven outlet, a baking portion, a prebaking portion, and a pathway extending through the prebaking and baking portions. At least a portion of the oven conveyor extends through the oven unit along the pathway. The oven unit has a heat diffuser adjacent to the baking portion to shield at least a portion of the prebaking portion and the dough holders from heat applied to the baking portion. The oven conveyor is configured to move the dough holders through the baking portion at a rate so the single batches of dough in the dough holders will be sequentially baked to form the baked products when the dough holder exit the oven unit.

Aspects of the invention provide a system for the continuous production of baked products. At least one embodiment of the system comprises a dry ingredient metering unit, at least one dough mixing unit, a dough resting and forming unit, and an oven unit. The dry ingredient metering unit has an inlet for receiving dry ingredient and at least one outlet for discharging a succession of metered amounts of the dry ingredient. Each metered amount of dry ingredient discharged has a volume suitable for the production of a single batch of dough.

In one embodiment, the metering unit comprises a hopper, a platform support, and a platform assembly pivotally mounted below the hopper atop the platform support. The hopper includes the aforementioned inlet for receiving dry ingredient. As well, it includes an outlet for discharging dry ingredient. The platform support includes an opening extending through the support from an upper surface of the support to the mixer inlet of the dough mixing unit. The platform assembly includes an upper platform having an upper surface, a lower platform spaced apart from the upper platform and having a lower surface in slidable communication with the upper surface of the support, and a chamber for metering dry ingredient. The chamber extends between and through the platforms from an upper opening in the upper surface of the upper platform to a lower opening in the lower surface of the lower platform. The platform assembly is pivotable between a first position where the chamber is aligned with the hopper outlet and a second position where the chamber is aligned with the mixer inlet. When the platform assembly is in the first position, then the lower opening of the chamber is closed by the upper surface of the platform support. When the platform assembly is in the second position, then the hopper outlet is closed by the upper surface of the upper platform.

With the foregoing arrangement, the metering chamber can be pivotally toggled back and forth between a position in alignment with the hopper outlet (e.g., a "first" position) where the chamber receives a flow of dry ingredient under the force of gravity until full, to a position in alignment with the mixer inlet (e.g., a "second" position) where it discharges the dry ingredient received, again under the force of gravity. The amount of dry ingredient received and discharged is inherently a metered amount which depends upon the size of the metering chamber.

In selected embodiments, the dough mixing unit has a mixer inlet and a mixer outlet. It receives through the mixer inlet a succession of metered amounts of dry ingredient discharged from the metering unit, then mixes and kneads each metered amount of dry ingredient so received with a liquid to produce a lump of dough, then discharges each lump of dough so produced through the mixer outlet.

In certain embodiments, the dough resting and forming unit comprises first and second conveyors and a dough former. The first conveyor is positioned to automatically receive a succession of lumps of dough discharged from the dough mixing unit and is operative to transport them away from the dough mixing unit to a distal end of the first conveyor. The second conveyor is positioned to automatically receive the succession of lumps of dough from the distal end of the first conveyor and is operative to transport them away from the first conveyor to a distal end of the second conveyor. The dough former is positioned above the second conveyor to operatively bear down upon and thereby form the lumps of dough to a shape compliment to the dough holders while the lumps are being transported by the second conveyor.

In selected embodiments, the oven unit comprises an oven unit inlet, an oven unit outlet, and an oven unit conveyor for transporting baking pans through the oven unit from the oven unit inlet to the oven unit outlet. The baking pans are located at spaced intervals along the oven unit conveyor. The oven unit conveyor is positioned and the baking pans are spaced along the oven unit conveyor for automatically receiving the succession of lumps of dough from the distal end of the second conveyor into discrete ones of the baking pans.

In certain embodiments, the oven unit also comprises a proofing chamber and a baking chamber. For example, the oven unit comprises an elongated horizontally oriented proofing chamber and an elongated horizontally oriented baking chamber which extends longitudinally above the proofing chamber. Then, the temperature along the length of each chamber will be more uniform than if the oven unit were oriented vertically.

In selected embodiments, the system for the continuous production of baked product avoids any need for manual intervention between the time when the dry ingredient metering unit is provided with dry ingredient and the time when baked product appears at the oven unit outlet. As will be apparent from the description which follows, in various embodiments the overall structure may embody more than one production line and may be made compact so that minimal floor space is occupied.

The foregoing and other features of the invention will now be described in more detail with reference to the accompanying drawings.

This Summary is provided to introduce a selection of concepts in a simplified form that are further described below in the Detailed Description. This Summary is not intended to limit the scope of the claimed subject matter.

DETAILED DESCRIPTION

Embodiments of the present invention include automated production processes and associated systems, including automated bread making processes which enable the continuous production of baked bread. Several specific details of the invention are set forth in the following description and in FIGS. 1-15 to provide a thorough understanding of certain embodiments of the invention. One skilled in the art, however, will understand that the present invention may have additional embodiments, and that other embodiments of the invention may be practiced without several of the specific features described below. In other instances, well known structures, materials, or operations are not shown or described in order to avoid obscuring aspects of the invention.

Figure 1:
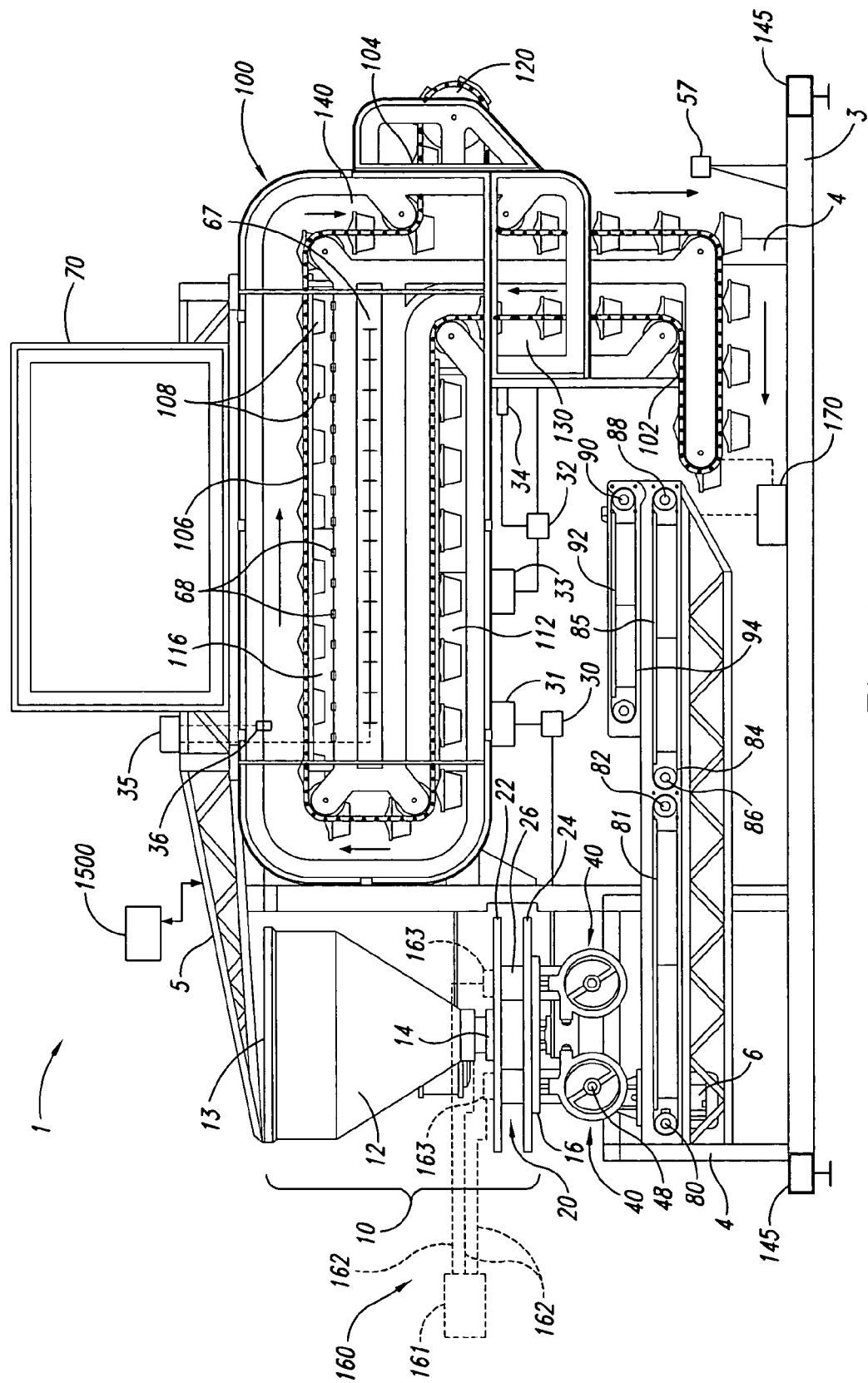
FIG. 1 is a partially schematic and partially sectioned side elevation of a production system configured for the continuous production of baked product in accordance with embodiments of the present invention.
Figure 2:
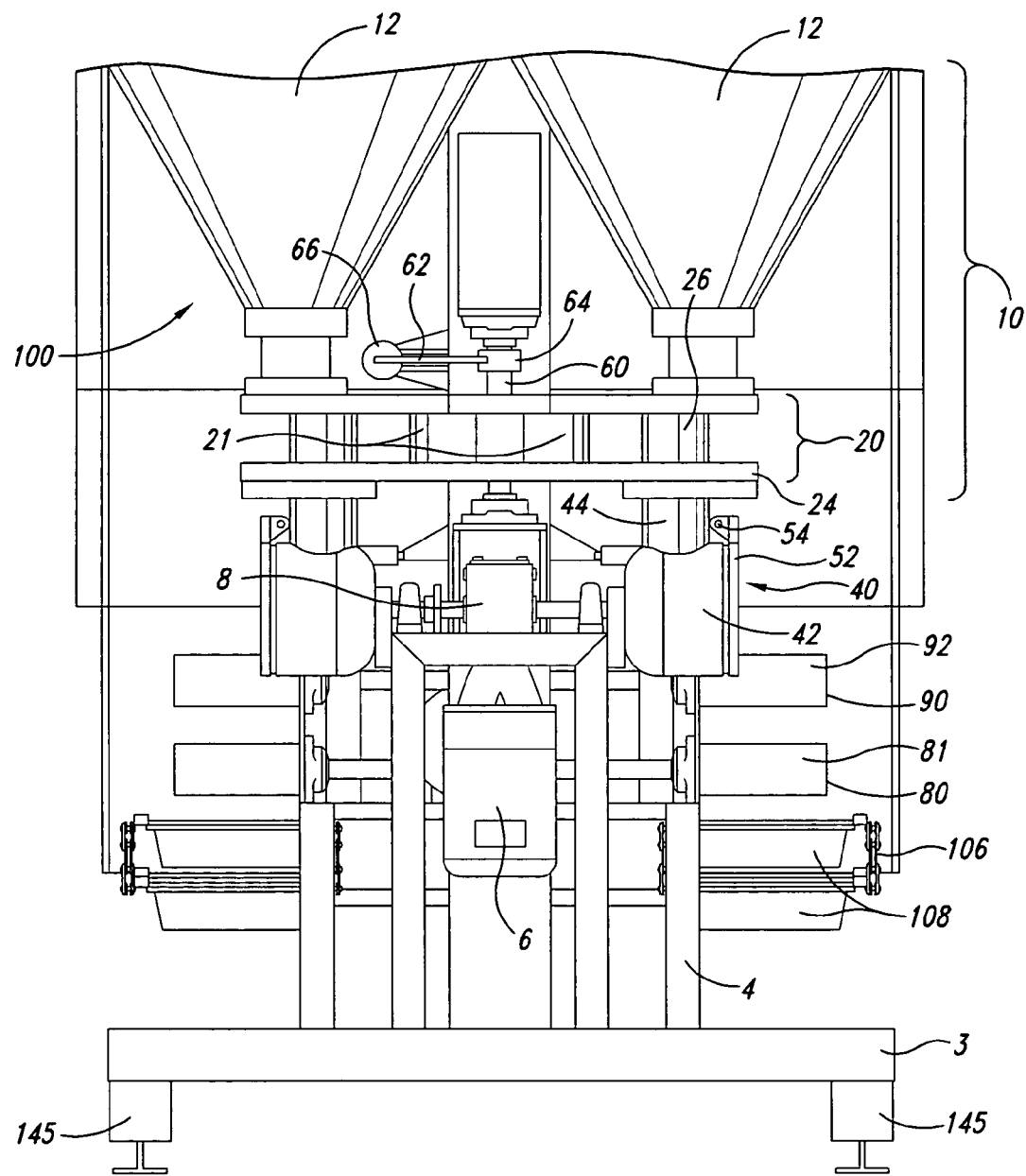
FIG. 2 is a partially schematic front end elevation of a portion of the system shown in FIG. 1.
Figure 3:
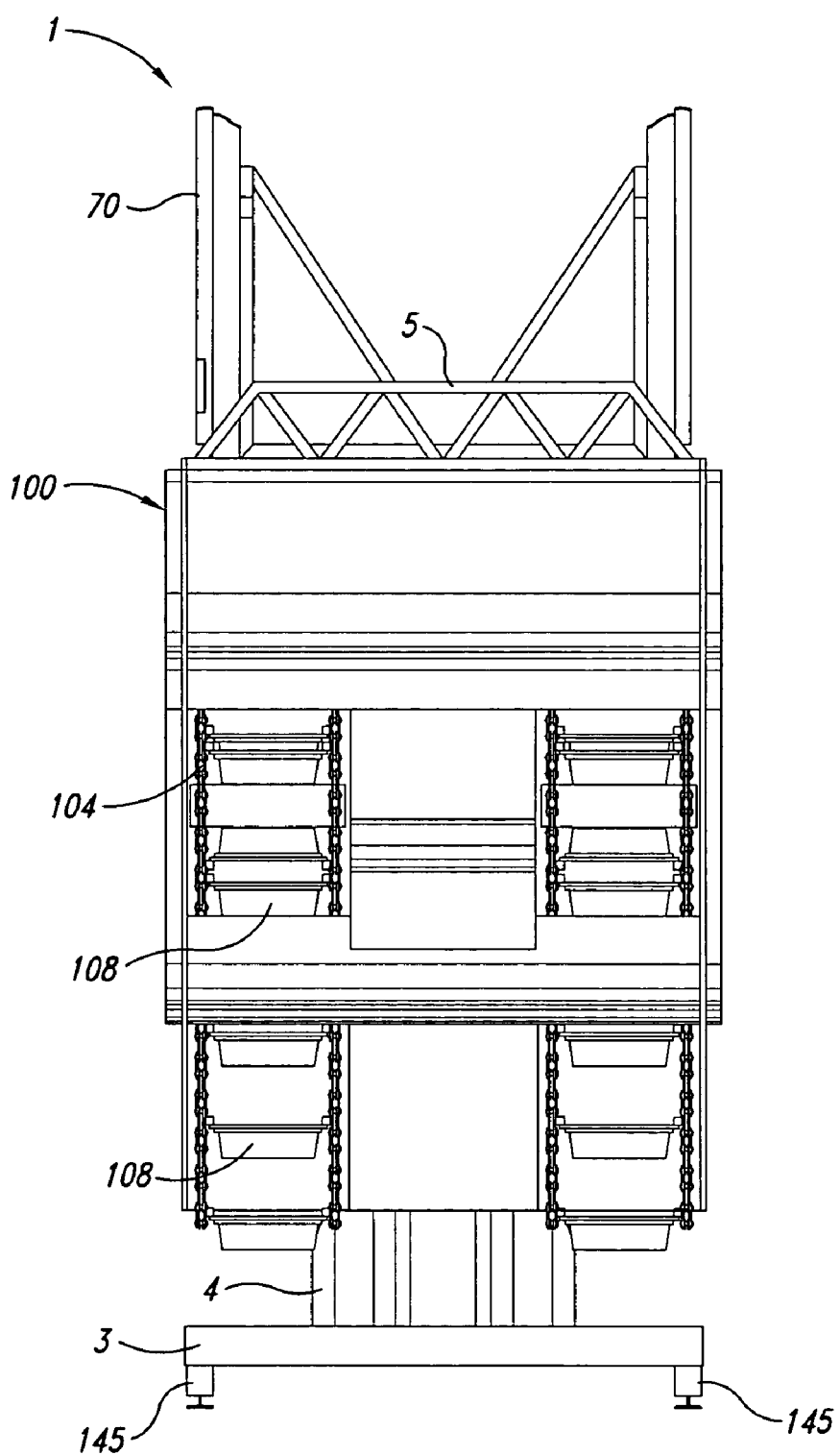
FIG. 3 is a partially schematic rear end elevation view from the end opposite to that shown in FIG. 2.

FIGS. 1-3 illustrate a production system 1 configured as an automated bread making machine that enables the continuous production of baked bread in accordance with certain embodiments of the invention. While the description provided herein for illustrative purposes involves a system, components and methods for continuous baking of bread, it is to be understood that embodiments of the system, and the components, and methods can be used for the production of other goods or products.

In the illustrated embodiment, the system 1 is configured for the continuous production of baked bread in two parallel production lines or paths defined by the flow of production ingredients (e.g., wet and dry ingredients) through the production system until final product is available (e.g., a loaf of bread is available for a consumer). As shown in FIGS. 1-3, one production path runs along one side of the system 1 and the other production path runs along the other side of the system 1. For example, FIG. 1 shows a partially schematic and partially sectioned side elevation of one of the production paths. As illustrated in FIGS. 2 and 3, the system 1 includes a similar production path on the other side of the system 1. Accordingly, for the purpose of illustration only the production path shown in FIG. 1 will be discussed in detail, and the description is equally applicable to the other paths.

Figure 4:
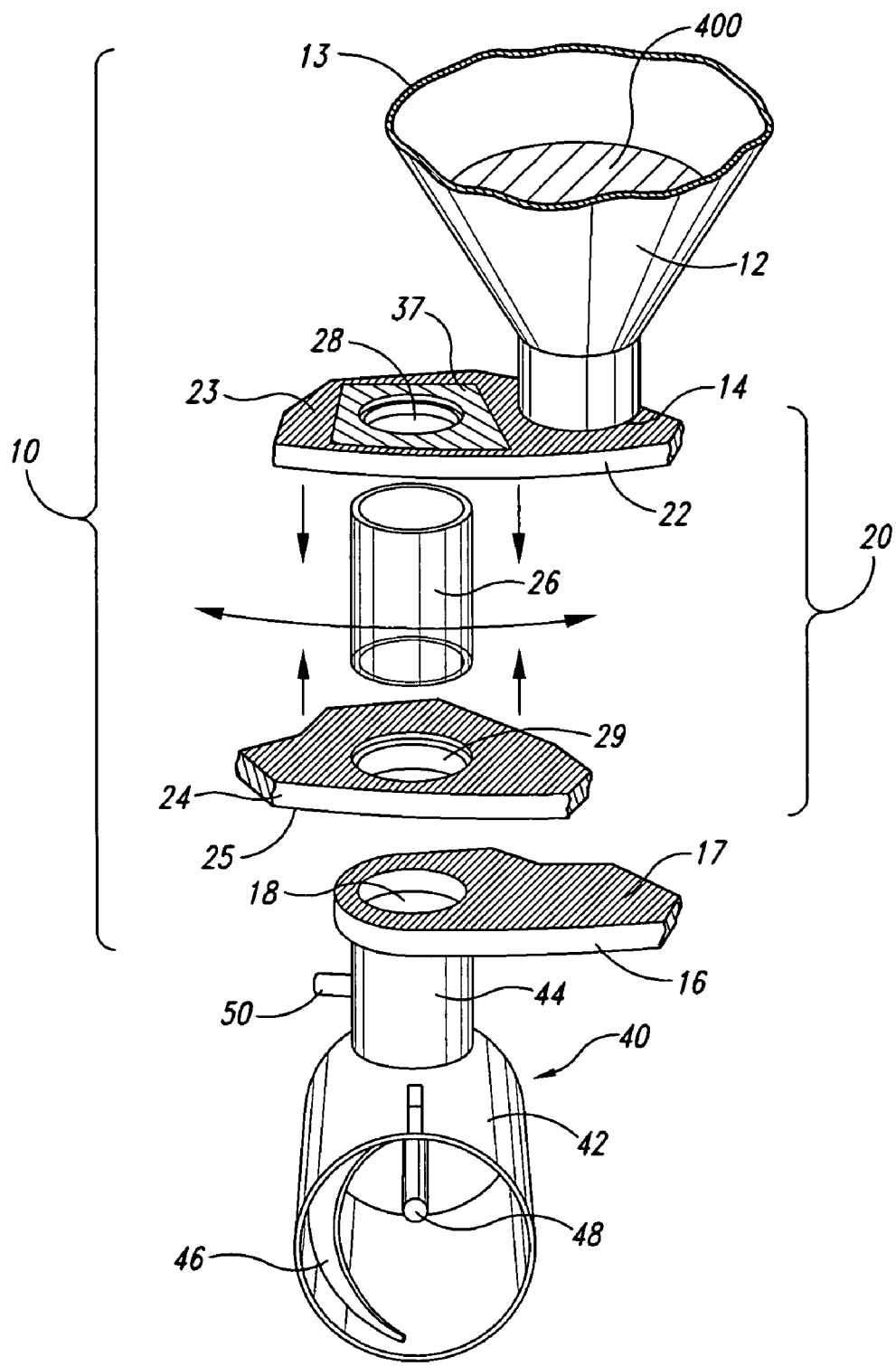
FIG. 4 is a partially schematic exploded perspective view of a portion of the dry ingredient metering units and one of the mixing units forming part of the system shown in FIG. 1.

The production path shown in FIG. 1 includes a dry ingredient metering unit 10, a liquid metering unit 30, and a pair of mixing units 40. In the illustrated embodiment, the dry ingredients for making bread and the mixing units 40 can be configured for mixing dough. For example, the dry ingredients can include flour, sugar, salt, yeast, spices, milk powder, and/or fruit powders. As best seen in FIG. 4, each mixing unit 40 of the illustrated embodiment comprises a horizontally oriented mixing chamber 42, and a vertically extending inlet 44 through which a predetermined mixture of the dry elements is introduced into the chamber. A mixing element 46 is mounted within the chamber 42 on a rotatable shaft 48. The system 1 illustrated in FIG. 1 includes two shafts with four shaft ends 48, each end associated with one of the mixing units (two shafts per production path), that are collectively rotatably driven by a motor 6, the drive shaft of the motor being coupled to shafts 48 through a gearbox 8. In various embodiments, the motor can include an electric, pneumatic, and/or hydraulic motor. In other embodiments, the system 1 can have other arrangements including more, fewer, or different mixing units, gearboxes, and/or motors.

Figure 7:
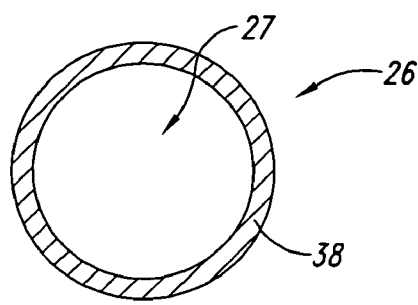
FIG. 7 is a partially schematic plan form illustration of the chamber shown in FIG. 4.

In various embodiments, a door 52 can be mounted to the mixing unit 40 by a hinge 54 (not shown in FIG. 4, but shown in FIGS. 2 and 7). The hinge 54 can include an actuator (e.g., electric, hydraulic, and/or pneumatic) coupled to a controller that moves the door 52 between an open and closed position. In the closed position, the door 52 can form the front or forward portion of the mixing chamber 42 covering an outlet 51. Door seals are provided that seals the door 52 with mixing chamber to fully contain the wet and dry ingredients deposited therein, as discussed below. In the open position the door 52 can allow the contents of the mixing chamber 42 to exit or be removed via the outlet 51.

In the illustrated embodiment, dry ingredients are introduced into the mixing chamber 42 via the inlet 44, and liquid is introduced into the mixing chamber 42 in controlled amounts via a tube 50 that extends through the sidewall of inlet 44. The mixing element 46 (shown in FIG. 6) is configured to mix and knead the dry ingredients and the liquid to form a ball of dough. For example, the mixing element 46 can include a helically shaped mixing and kneading blade (most clearly shown in FIG. 6). In the illustrated embodiment the mixing and kneading blade includes a first prong 47a and a second prong 47b (collectively 47). The prongs 47 are configured so that they pass proximate to the sides of the mixing chamber 42 to move the contents of the mixing chamber 42 towards the center of the chamber. Additionally, the second prong 47b is further from the closed door 52 than the first prong 47a, so that the contents are trapped in the gap between the door and the blade, which results in rolling and kneading the dough. Accordingly, the blades can be particularly well suited for kneading a dough ball during bread production.

In selected embodiments, the door 52 can be made of a transparent material so that spectators can observe the mixing and kneading process. In the illustrated embodiment, the mixing and kneading operation can proceed for a selected amount of time (e.g., determined by a controller, mechanical interconnect, and/or electrical interconnect, as discussed below in greater detail), for example, to produce a ball of dough. After the selected amount of time has passed, the door 52 can be automatically opened via the actuator. Because the mixing element 46 is configured to push the contents of the mixing chamber 42 toward the front of the chamber, the action of the mixing element 46 can push the ball of dough or other contents of the mixing chamber 42 out of the mixing chamber through the outlet 51. In other embodiments, the mixing chamber 42 can have other arrangements including more, fewer, or different doors 52 and more or different mixing elements 46. In selected embodiment, the dough mixing unit can be configured to mix single quantities of dough suitable for producing a single loaf of bread during each mixing cycle.

The dry ingredient metering unit 10 of the illustrated embodiment (shown in FIGS. 1 and 2) comprises two vertically oriented hoppers 12, one per production path. As shown in FIG. 4, each hopper 12 includes an open top end or inlet 13 for receiving a dry element 400 (e.g., a mixture of the dry ingredients in accordance with a selected recipe for bread) from an external source. A hopper cover (not shown) can be placed over the inlet 13. The hopper 12 also has a closeable bottom end or outlet 14 that, when opened, provides an outlet for discharging the dry element 400 from the hopper 12. Further, the dry ingredient metering unit 10 comprises a platform support 16 having a flat upper surface 17, and a platform assembly 20. Four passageways or holes 18, each associated with a respective one of the four mixing units 40, extend through platform support 16 from the upper surface 17 of the support to inlet pipe 44 of the associated mixing unit (only one hole 18 and mixing unit 40 are shown in FIG. 4).

In the illustrated embodiment, the platform assembly 20 is pivotally mounted below hopper 12 and atop platform support 16 in a substantially sealed arrangement that prevents leakage of the dry ingredients. The platform assembly 20 includes an upper platform 22 having a flat upper surface 23, a lower platform 24 having a flat lower surface 25 and four chambers 26 for metering or measuring portions of the dry element 400. Two of such metering chambers 26 are associated with one of the production paths and the associated hopper 12. The other two metering chambers 26 are associated with the other production path and the other hopper 12. The metering chambers 26 extend between the upper and lower platforms 22 and 24, each from an associated upper opening 28 in upper surface 23 of platform 22 to an associated lower opening 29 in lower surface 25 of platform 24. Space between the platforms is maintained by support posts 21 shown in FIG. 2.

In FIG. 2, platform assembly 20 is mounted to a shaft 60, the opposed ends of which are supported by bearings that enable the shaft and the platform assembly 20 to pivot or toggle clockwise and counterclockwise around the axis of the shaft 60. The shaft 60 and platform assembly 20 are moved through controlled angles of rotation to desired positions, as shown in FIGS. 5A-5D. Such pivoting action of the platform assembly 20 is achieved by linear movement of a control arm 62. One end of the control arm 62 is tangentially coupled to the shaft 60 by a sleeve 64 fitted on the shaft near the shaft's top end. An opposed end of the control arm is coupled to an air cylinder drive 66 coupled to a source of compressed air (internal or external). Other linear-actuated drive systems can include electrically driven rack and pinion, ball screw, hydraulic, etc., or rotary drive such as stepper or servo motors, etc. As the air cylinder drive 66 moves the control arm 62 linearly, the shaft 60 pivots about its vertical axis. As discussed in further detail below, in selected embodiments the dry ingredient metering unit 10, including the air cylinder drive 66, can be controlled by a controller so that the metering of the dry element 400 is automated and coordinated with the rest of the production system 1.

Figure 5A:
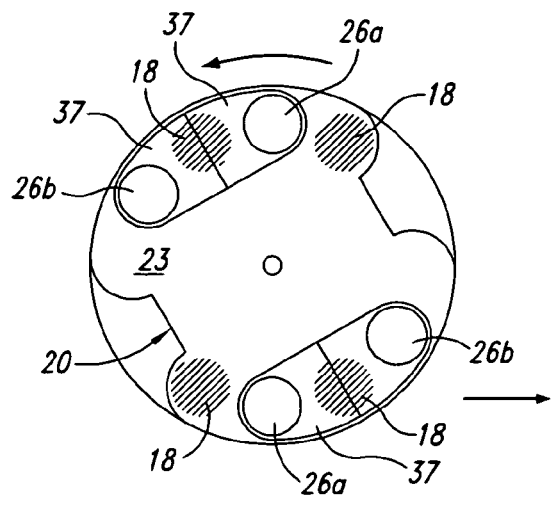
FIGS. 5A to 5D are partially schematic illustrations showing successive pivotal toggling positions of the platform assembly shown in FIG. 1 in a representational manner.
Figure 5B:
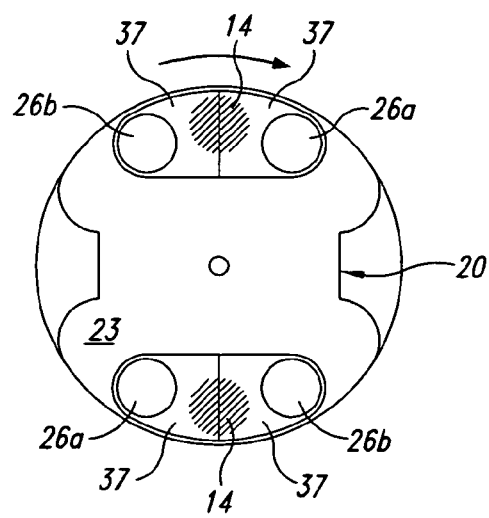
Figure 5C:
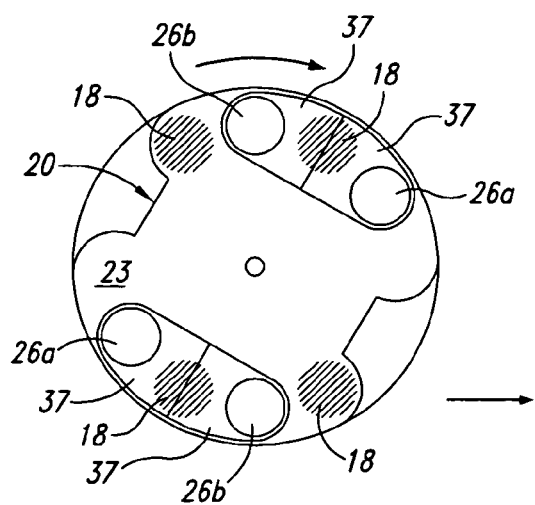

FIGS. 5A to 5D are partially schematic illustrations showing successive pivotal toggling positions of the platform assembly 20 shown in FIG. 1 in a representational manner in accordance with selected embodiments. As discussed above, the platform assembly 20 of the illustrated embodiment includes four chambers 26, two per production path. In FIGS. 5A-5D these four chambers are shown as first chambers 26a and second chambers 26b. Each production path having one first chamber 26a, one second chamber 26b, and an associated hopper 12. In FIG. 5A, the platform assembly 20 has been pivoted counterclockwise to a position where the first chambers 26a are aligned under the outlets 14 of their associated hoppers 12 (shown in FIGS. 1, 2, and 4). In this position, the lower openings 29 of all of the chambers are closed or blocked by the upper surface 17 of the platform support 16. Thus, each first chamber 26a is in position to be filed with dry element 400 from its associated hopper 12 (e.g., via gravity feed, auger feed or belt feed, etc.). In FIGS. 5A and 5C, the relative positions of the holes 18 in the support 16 positioned below the platform assembly 20 (opening into inlet 44 to the mixing chamber 42) are indicated by shaded areas and are blocked by the lower surface 25 of lower platform 24.

Figure 5D:
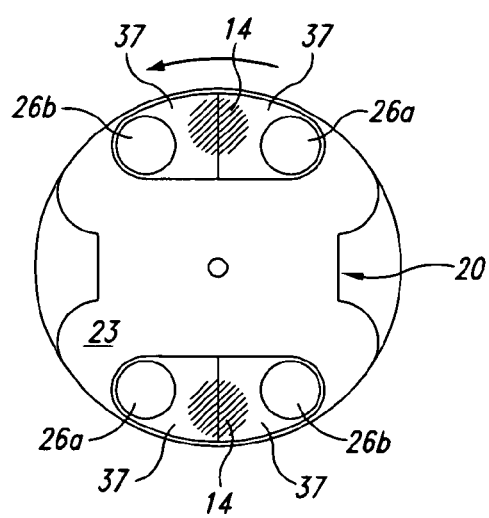
Figure 6:
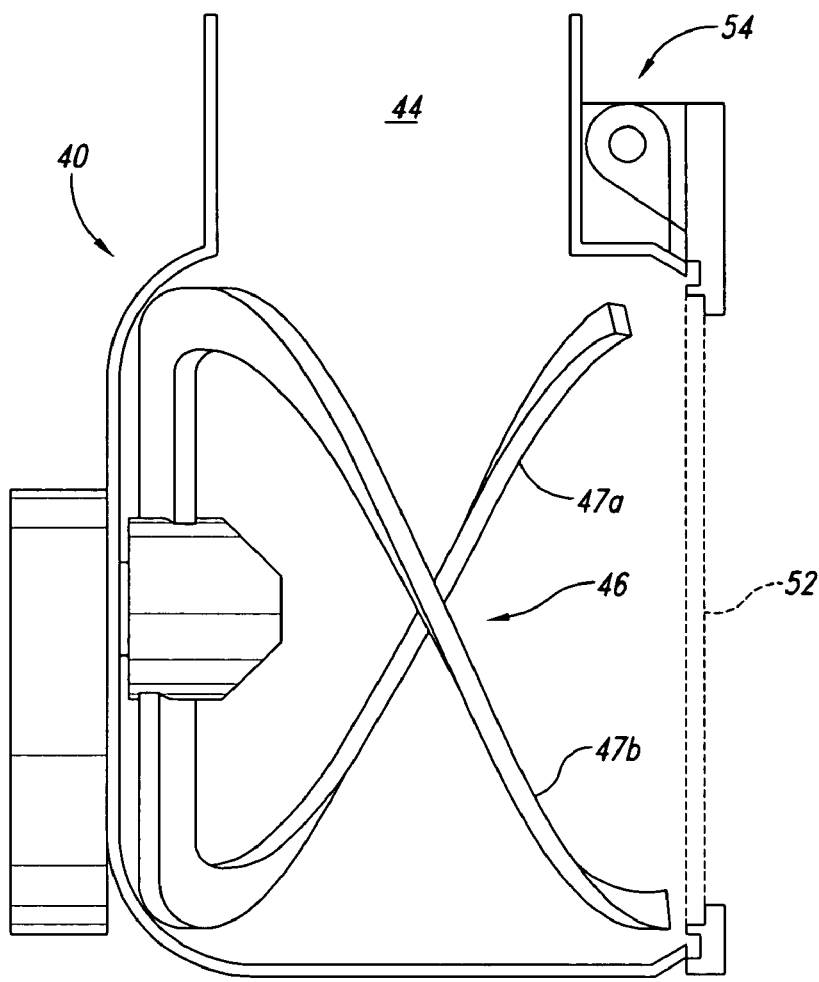
FIG. 6 is a partially schematic cross-sectional illustration of a portion of a mixing unit of the system shown in FIG. 1.

In FIG. 5B, the platform assembly 20 has been pivoted clockwise from the position shown in FIG. 5A, to a position where the first and second chambers 26a and 26b are in alignment with the inlet pipe 44 of their associated mixing units 40 in each corresponding production line. In this position, dry element 400 exits the first chambers 26a (e.g., via gravity feed) through the holes 18 in the platform support 16 and into the corresponding mixing units 40. Additionally, the outlet 14 from the hopper 12 in each production line is blocked by upper surface 23 of platform 24, so the dry element 400 can not exit the hopper. In FIGS. 5B and 5D, the relative position of the hopper outlets 14 are indicated by shaded regions.

In FIG. 5C, the platform assembly 20 has been pivoted clockwise from the position shown in FIG. 5B to a position where the second chambers 26b are aligned under the outlets 14 of their associated hoppers 12 (shown in FIGS. 1, 2, and 4). In this position, the lower openings 29 of all of the chambers are closed or blocked by the upper surface 17 of the platform support 16. Thus, each second chamber 26b is in position to be filed with dry element 400 from its associated hopper 12 (e.g., via gravity feed).

In FIG. 5D, the platform assembly 20 has been pivoted counterclockwise from the position shown in FIG. 5C, to a position where the first and second chambers 26a and 26b are in alignment with the inlet pipe 44 of their associated mixing units 40 in each corresponding production line. In this position, dry element 400 exits (e.g., via gravity feed) the second chambers 26b through the holes 18 in the platform support 16 and into the corresponding mixing units 40. As discussed above, the outlet 14 from the hopper 12 in each production line is again blocked by upper surface 23 of platform 24. In operation, the sequence of steps illustrated in FIGS. 5A-5D can be continuously repeated, the result being the production of a succession of lumps of dough from each dough mixing unit 40.

Various components (e.g., surfaces) of the platform assembly 20, platform support 16, and/or hopper outlets 14 can be made from or coated with low friction materials, such as nylon, ultra high molecular weight (UHMW) plastic, or other suitable materials. The low friction materials allow the various components to slide smoothly relative to one another, thereby reducing wear, and/or reducing the tendency for the dry element 400 or other materials to stick or adhere to the surfaces. They also provide for the sealing arrangement preventing the dry ingredients from leaking out.

Figure 8:
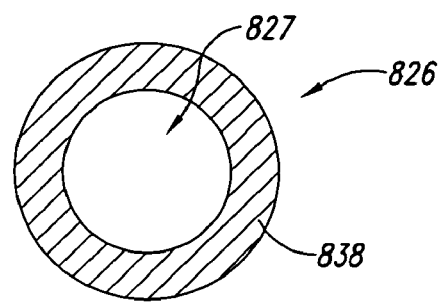
FIG. 8 is a partially schematic plan form illustration of an alternate chamber generally similar to the chamber shown in FIG. 4.

It is noteworthy that in the illustrated embodiment, the amount of dry ingredients that goes into each lump of dough is an amount metered by volume (e.g., by the volume of each chamber 26) rather than by weight. Accordingly, the chambers 26 are sized and configured so that, when a chamber 26 is in position to be filed with dry element 400 from its associated hopper 12, the pre-selected amount of the dry element 400 needed for a single lump of dough is dispensed by filling the internal volume 27 of the chamber 26 (shown in FIG. 7). Accordingly, the proper amount of dry element is obtained each time by filling the entire internal volume of the chamber 26. As illustrated in FIGS. 5A-5D, in selected embodiments the platform assembly 20 can include one or more removable panels 37 that allow the chamber(s) 26 (shown in FIGS. 4 and 7) to be removed and replaced with the different chamber(s) 826 having a different and predetermined internal volume (shown in FIG. 8). In FIG. 8, the chamber 826 has a thicker sidewall 838 than the sidewall 38 of the chamber 26 shown in FIGS. 4 and 7. Because the chamber 826 of FIG. 8 has the same height as the chamber 26 of FIG. 4, but a thicker sidewall 838, the chamber 826 has a smaller internal volume 827 and holds less dry element 400. In this way, the amount of dry element can be varied for different operations (e.g., for different recipes) by selecting the desired chamber.

In other embodiments, the production system 1 can have other arrangements including more or different dry ingredient metering units 10 and/or dry ingredient metering units 10 with different actuation systems. For example, in selected embodiments the chamber(s) 26 can have other sizes and/or shapes. In yet other embodiments, the dry ingredient metering units 10 can be configured to meter the dry element by weight. In still other embodiments, as shown in FIG. 1, the production system 1 can include a gas purging system 160 (shown in ghosted lines) that uses a gas to aid in evacuating the dry element 400 from the chambers 26 so that it can pass through the holes 18 in the platform support 16 and into the corresponding mixing units 40.

In the illustrated embodiment, the purge system 160 includes a gas supply 161 (e.g., a pump and/or supply tank) operably coupled via supply lines 162 to deliver gas to distributors 163. The distributors 163 can include a filter element to filter the gas passing through the distributors 163. The distributors 163 can be positioned above the platform assembly 20 so that when the platform assembly 20 is positioned as shown in FIGS. 5B and 5D, the distributors 163 can provide a flow of gas into one or more of the chambers 26. The flow of gas can act to push dry element 400 out of the chambers 26 and through the holes 18 in the platform support 16 and into the corresponding mixing units 40. In other embodiments, the purge system 160 can include other arrangements. For example, in the illustrated embodiment the gas supply 161 supplies a gas that includes air, while in other embodiments the gas purge system 160 uses other types of gas.

Figure 9:
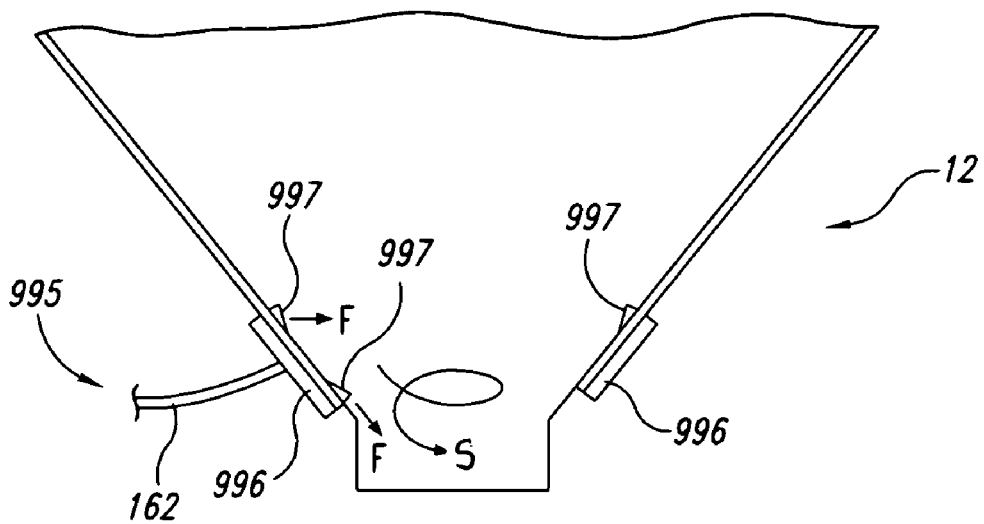
FIG. 9 is a partially schematic cross-sectional elevation view of a hopper of the system shown in FIG. 1.
Figure 10:
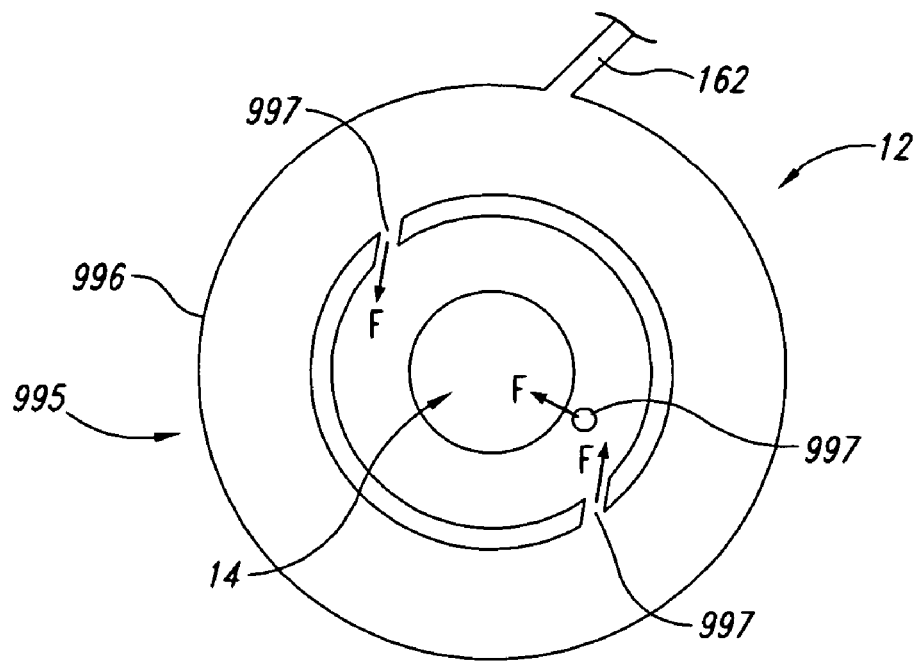
FIG. 10 is a partially schematic cross-sectional plan form view of the hopper of the system shown in FIG. 9.

In selected embodiments, the gas supply 161 can also supply a gas to an anti-bridging system 995 in the hopper 12 shown in FIGS. 9 and 10. In the illustrated embodiment, the anti-bridging system 995 includes a manifold 996 with one or more orifices 997 that direct a flow of pressurized gas F into the hopper 12 at a selected direction. For example, the orifices 997 are arranged so that flow of gas is directed toward a portion of the dry element 400, thereby producing a downwardly swirling flow mixture of gas and dry element 400 proximate to a lower portion of the hopper 12 and the hopper outlet 14. In the illustrated embodiment two of the orifices 997 produce at least approximately horizontal flows of gas F, and at least one of the orifices 997 produces a flow of gas F directed downwardly at at least approximately a 45 degree angle relative to the wall of the hopper 12. The combination of the flows of gas F with the dry element 400 can create the downwardly swirling flow S that prevents the dry element 400 from bridging at or above the hopper outlet 14. In the illustrated embodiment, the pressurized gas is air, although other pressurized gas (e.g., nitrogen or other inert gas) can be used. In other embodiments, the anti-bridging system 995 can have other arrangements. For example, in other embodiments the anti-bridging system 995 can include its own gas supply and/or supply lines. In still other embodiments, the anti-bridging system 995 can include a mechanical stirring system or vibration.

As discussed above, after the dry element 400 is introduced into the mixing chamber 42, liquid is introduced into the mixing chamber 42 in controlled amounts via a tube 50 that extends through the sidewall of inlet 44. As shown in FIG. 1, a liquid metering unit 30 can provide temperature controlled liquid to the mixing chamber 42 from one or more liquid temperature control units 31. The liquid temperature control units 31 can be, as an example, a liquid cooler, a liquid heater, or a heat exchanger coupled to an oven unit, which is discussed below in greater detail. In the illustrated embodiment, the liquid metering unit 30 includes a liquid controller 1175, one or more liquid measurement assemblies 1176, and one or more liquid sensor units 1179 (shown in FIG. 11). In certain embodiments, one liquid controller 1175 can control four liquid measurement assemblies 1176 and four liquid sensors units 1179 (one for each mixing unit). In other embodiments, the production system 1 can include more or fewer liquid controllers 1175, liquid measurement assemblies 1176, and/or liquid sensors units 1179. For the purpose of illustration, only one liquid controller 1175, liquid measurement assembly 1176, and liquid sensors unit 1179 is shown in FIG. 11.

Figure 11:
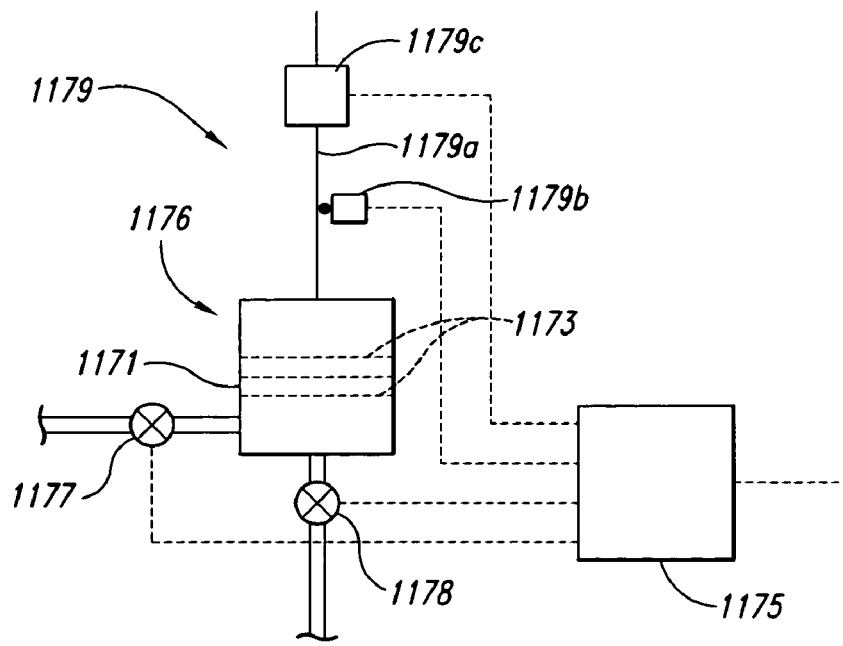
FIG. 11 is a partially schematic illustration of liquid metering unit of the system shown in FIG. 1.

In FIG. 11, the liquid measurement assembly 1176 includes a container 1171, an inlet valve 1177, and an outlet valve 1178. The inlet and outlet valves 1177 and 1178 are operatively coupled to the liquid controller 1175 and configured to be opened and closed by commands received from the controller 1175. The liquid sensor unit 1179 includes a threaded sensor rod 1179a, a contact brush 1179b, and a motor 1179c. The motor 1179c can be an electric motor and is configured to rotate the rod 1179a so that the threaded portion causes the rod 1179a to move axially (up and down) relative to the motor 1179c and the liquid measuring assembly 1176. The motor 1179c can be operably coupled to the liquid controller 1175 and rotate in response to commands received from the liquid controller to place the rod 1179a in a selected position relative to the container 1171. The contact brush 1179b is configured to slidably contact the rod and to provide an electrical current to the rod so that changes in conductivity (resistance, impedance, or the like) can be measured by the controller 1175.

Once the rod 1179a is positioned relative to the container 1171, the liquid controller 1175 can then open the inlet valve 1177 to allow liquid from the liquid temperature control units 31 to enter the container 1171. As the fluid rises, the fluid contacts the rod 1179a. When the fluid contacts the rod, a change in conductivity can be measured by the controller 1175, and the controller 1175 can close the inlet valve 1177. The controller 1175 can then open the outlet valve 1178 to supply the measured quantity of fluid to the corresponding mixing unit at the appropriate time.

The liquid metering unit 30 can have other arrangements in other embodiments. For example, in selected embodiments the liquid metering unit 30 can be mechanically operated and synchronized with the operation of other components of the production system 1. In still other embodiments, the liquid can be metered by weight instead of volume.

In the illustrated embodiment, the liquid noted above is water. If it is desired to use ingredients other than water that in principal could be added to mixing chamber 42 in liquid form, then those ingredients are added in dry form as part of the "flour". Thus, for example, milk can be provided in the form of milk powder, lemon juice can be provided in the form of lemon powder, etc. In other embodiments, the liquid can include fluids other than water (e.g., milk or lemon).

In each line of production, the lumps of dough mixed in the mixing units 40 are pushed out of the mixing chamber 42 and move to an associated dough resting and forming unit that includes first and second conveyors 80 and 84 and a dough former 90. The first conveyor 80 comprises a continuous conveyor belt 81 positioned to automatically receive the succession of lumps of dough discharged from the pair of dough mixing units 40 in its line of production. The first conveyor 80 is operative to transport the same away to a distal end 82 of the conveyor belt 81. The second conveyor 84 comprises a continuous conveyor belt 85 positioned with its proximal end 86 very near the conveyor 80 so as to automatically receive the succession of lumps of dough near its proximal end from the distal end 82 of the conveyor belt 81. The second conveyor 84 is operative to transport the lumps of dough away from the proximal end to the distal end 88 of the conveyor belt 85.

The dough former 90 of the illustrated embodiment comprises a continuous upper belt 92 positioned above the second conveyor 84 to operatively bear down upon and shape the lumps of dough as they are being transported by the second conveyor 84. During operations, while the belt 85 of the second conveyor 84 rotates clockwise and moves lumps of dough from left to right, the upper belt 92 also rotates clockwise so that an underside bearing surface 94 of the second belt moves in an opposite direction (e.g., right to left and at a slower speed) relative to the top of the lower belt 85. In so doing, the upper belt 92 bears down upon lumps of dough moving along the second conveyor 84, thereby rolling and shaping the lumps of dough as they move to the end of the second conveyor.

During operations, the first conveyor 80 transports the lumps of dough at a relatively slow speed, whereas the second conveyor 84 transports the lumps of dough at a relatively fast speed. For example, in selected embodiments the dwell time of a lump of dough on the first conveyor 80 may be of the order of nine to twelve minutes. This allows the dough an opportunity to rest or relax, which is an important step in the art of bread making. In contrast, the dwell time on the second conveyor 84 may be of the order of seven to ten seconds. Here, the primary object is not to allow the dough to rest or relax; the object is to transform each lump of dough into a shape suitable for carriage by a baking pan. With the underside bearing surface 94 of the upper belt 92 traveling counter to the direction of movement of the lumps of dough while bearing down on the lumps as they travel atop the belt 85, the effect is roll each lump of dough counter to the direction of movement. Accordingly, the lumps of dough are shaped into a more or less cylindrical shape and size suitable for reception by a baking pan, as discussed below.

In the illustrated embodiment the lumps of dough that exit from the dough mixing units 40 may have a somewhat random, irregular globular shape unsuited for reception by a baking pan. In certain embodiments, the lumps of dough exiting the mixing units 40 can be large enough to make multiple loaves of bread and the upper belt 92 or other portion of the dough resting and forming unit can include a device that separates a shaped piece of dough into multiple loaf size pieces. For example, in selected embodiments the upper belt 92 can include a divider section that separates a lump of dough in half after the shaping process.

In the illustrated embodiment, the conveyors 80, 84, and 90 are all cantilevered and driven by one or more motor units 170 (e.g., an electrical motor and gearbox). In the case of the conveyors 80 and 90, this arrangement can best be seen in FIG. 2. More particularly, the conveyors 80 and 90 are supported only from an inner end. Although not visible in FIG. 2, the same is true for the second conveyor 84. An advantage of the cantilevered support is that it enables the surfaces of the conveyor belts 81, 85, and 92 to be easily wiped and cleaned without having to reach over or around mechanical elements used to support the conveyors, which can be important with respect to a food handling apparatus. This arrangement allows the consumer to view the entire rolling action by way of not having an outside frame rail to obstruct such view.

Each production line in the production system 1 also includes an oven unit 100. The oven unit 100 includes an oven unit inlet 102, an oven unit outlet 104, and an oven unit conveyor 106. The oven conveyor 106 is carried and directed by a series of sprockets and configured to transport baking pans 108 (e.g., non-stick baking pans) located at spaced intervals along the chain conveyor 106 through the oven unit 100 from the oven unit inlet 102 to the oven unit outlet 104. The oven unit conveyor 106 of the illustrated embodiment is a chain conveyor and is positioned with the baking pans 108 spaced along the conveyor to receive the succession of lumps of dough from the distal end 88 of the second conveyor 84 into discrete ones of the baking pans 108. Accordingly, each baking pan 108 receives one shaped lump of dough. The oven unit conveyor 106 is driven by the one or more motor units 170. In selected embodiments, a spray system 57 can coat the interior of the baking pans 108 before each baking pan receives its shaped lump of dough.

Figure 12:
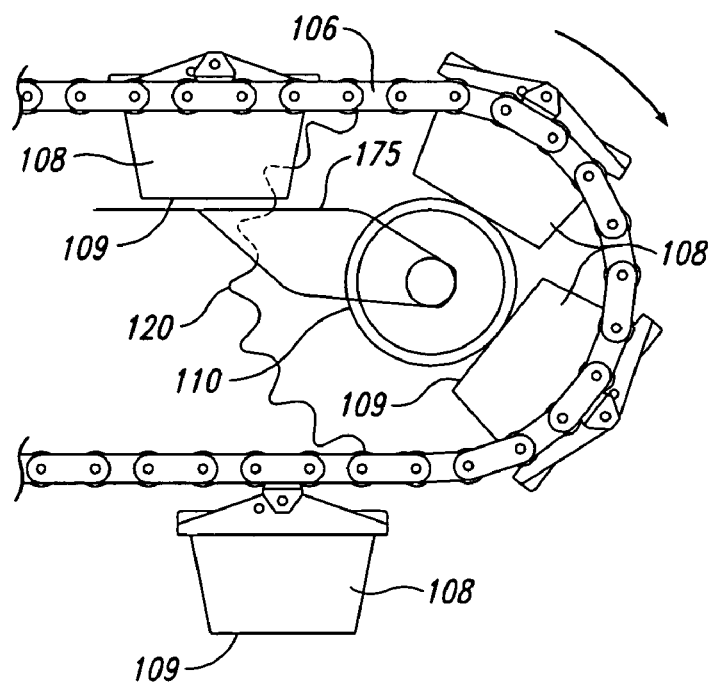
FIG. 12 is a partially schematic illustration showing the carriage and orientation of containers as they exit from the oven unit forming part of the system shown in FIG. 1.
Figure 13:
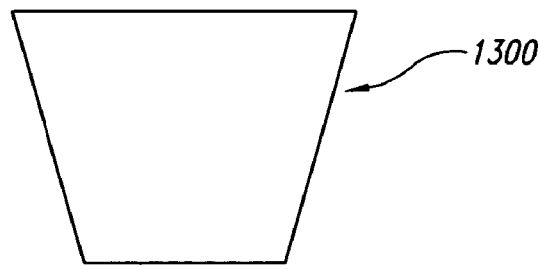
FIG. 13 is a partially schematic illustration of a bin suitable for catching bread released from baking pans of the system shown in FIG. 1.
Figure 14:
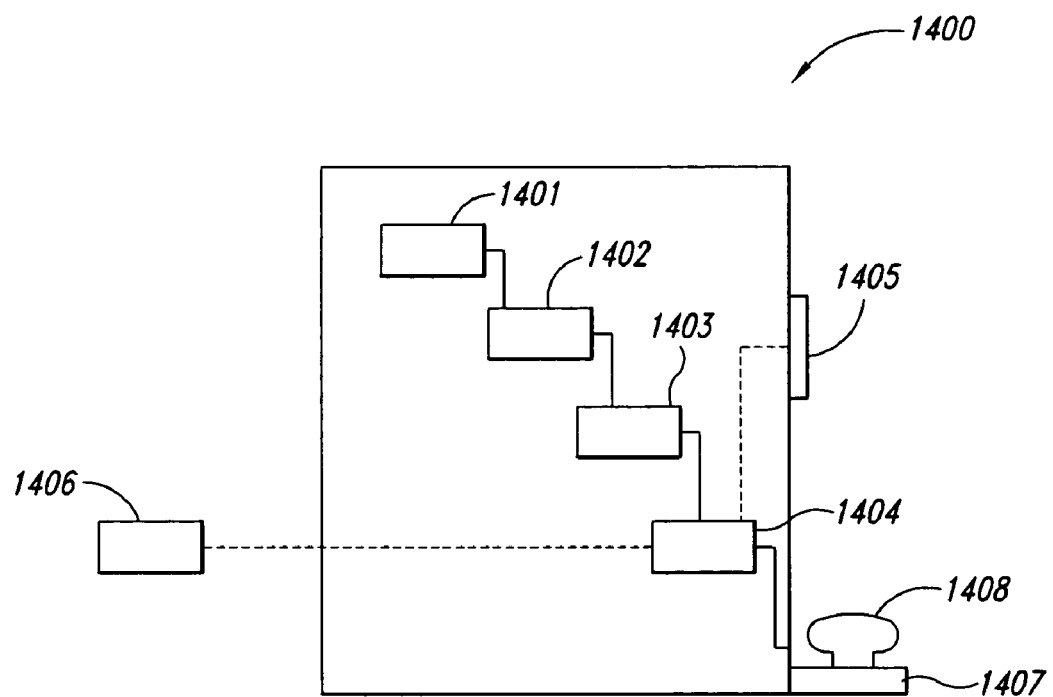
FIG. 14 is a partially schematic illustration of a processing unit suitable for processing bread released from the baking pans of the system shown in FIG. 1.

Details of how the baking pans 108 are carried and directed at an outlet 104 of the oven unit 100 are shown more clearly in FIG. 12. In particular, as the baking pans 108 travel around a discharge sprocket 120, the bottoms 109 of the baking pans are engaged and directed by a cylindrical shaft 110 or other type of engaging device held to and rotating with the sprocket. This forces the baking pans 108 to invert while traveling around the sprocket 120 and to thereby better allow baked bread to drop via the force of gravity from the respective baking pan 108. In certain embodiments, the cylindrical shaft 110 can be configured to cause the baking pans 108 to flex as the pans are inverted, thereby further urging the loaves to separate from the pans 108 as the pans 108 are inverted. In one embodiment, the shaft 110 can have a conical shape that assists in flexing the baking pans 108. In selected embodiments, a ramp device 175 can engage the bottoms 109 of the pans 108 to stabilize the pans (e.g., stop the pans from swinging relative to the chain conveyor 106) as the baking pans (with the baked bread therein) approach the cylindrical shaft 110. In certain embodiments, the ramp device 175 can be made from, or coated with, UHMW plastic, copper or brass, although other materials could be used.

Once the baked loaves of bread are dropped away from pans 108, the loaves of bread can be handled in various manners. For example, in selected embodiments the loaves simply drop into a bin 1300 (shown in FIG. 13) as they drop from the baking pans 108. In other embodiments, the loaves drop onto another conveyor, similar to the conveyors discussed above, and are carried away for processing. In still other embodiments, a processing unit 1400 (shown in FIG. 14) can be positioned to receive the loaves 1408 as they fall from the baking pans 108. The processing unit 1400 can include a catch and flip station 1401 that catches the loaves 1408 as they fall from the baking pans 108 and flips the loaves 1408 so that the loaves sit right side up (e.g., each loaf is supported by a portion of the loaf that was proximate to the bottom of the pan in which it was baked). The loaves 1408 are then transferred to the cooling station 1402 where the loaves are allowed to cool for a period of time. The loaves are then transferred to a wrapping station 1403 where the loaves can be wrapped. The loaves are then transferred to the holding station 1404 where the loaves can be stacked and are stored until a customer input is made via a service control panel 1405. In response to a customer input, a loaf can be transferred to the pickup station 1407 where the customer can carry away the selected loaf 1408. Accordingly, the loaves produced by the production system 1 can be stored and accessed one loaf at a time by various customers.

In other embodiments, the processing unit 1400 can have other arrangements, including more or fewer stations. For example, although in the illustrated embodiments the processing unit 1400 is fully automated, in other embodiments the processing unit 1400 is only partially automated. In still other embodiments, the processing unit 1400 can include an annunciation system that notifies service personnel that the holding station 1404 is nearly full, that one of the stations has malfunctions, or that other types of service is required. In selected embodiments, the processing unit 1400 can be configured to handle bread from both sides of the production system 1 (e.g., both production lines). In other embodiments, a separate processing unit 1400 can be positioned to handle each production line separately. In certain embodiments, one or more processing unit 1400 can be integrated with, or an integral part of, the production system 1. In other embodiments, the processing units 1400 can be completely separate devices that are simply positioned proximate to the production systems 1.

The oven unit 100 comprises an elongated horizontally oriented proofing chamber 112 and an elongated horizontally oriented baking chamber 116 positioned above the proofing chamber. In the illustrated embodiment, one or more heating elements 67 are positioned between the proofing chamber 112 and the baking chamber 116. The heating element 67 can be separated from the proofing and baking chambers 112 and 116 by diffusor plates 69. The diffusor plates 69 are configured to help control the head from the heating elements 67 provided into the proofing and/or baking chambers 112 and 116. For example, the diffusor plates 69 between the heating elements 67 and the proofing chamber 11 are substantially solid (non-perforated) to greatly diffuse the heat so the temperature and humidity in the proofing chamber 112 remains within the desired range (e.g., for proofing, but not baking, of the dough).

The diffuser plates 69 between the heating elements 67 and the baking chamber 116 are perforated to allow for direct heating into the baking chamber to bake the bread at elevated temperatures as compared to the temperature in the proofing chamber 112. The perforations 68 in the diffuser plates 69 can allow for heated air flow through the baking chamber 116, thereby providing some convective heating within the baking chamber 116. Accordingly, in the illustrated embodiment more heat is delivered from the heating element 67 to the baking chamber 116 than is delivered to the proofing chamber 112. For example, in selected embodiments the temperature maintained in proofing chamber 112 can be relatively low (e.g. approximately 95 degrees Fahrenheit/35 degrees Centigrade), while the temperature in the baking chamber 116 can be much higher (e.g., typical bread baking temperatures).

In order to control the temperature in the oven unit 100, the heating element(s) 67 can be operably coupled to a temperature controller 35. The temperature controller 35 can be coupled to at least one temperature sensor 36 located on or in the oven unit 100, such as in the proofing chamber 112 and/or the baking chamber 116. Based on the sensed temperature, the temperature controller 35 can adjust the heating elements 67 to change to, or maintain, a selected temperature or temperature range. For example, in selected embodiments the temperature controller 35 can include a Proportional-Integral-Derivative controller (PID controller) and the heating element(s) 67 can include on/off heating unit(s).

In certain embodiments, the PID controller can provide a scheme for capturing and maintaining the selected temperature or temperature range by cycling the heating unit(s). For example, in one embodiment, the PID controller can command the heating unit(s) to heat continuously until a temperature at the sensor 36 is within 25 degrees Fahrenheit of the selected temperature. The PID controller can then command the heating unit(s) to heat for 8 seconds and turn off for 2 seconds until the temperature at the sensor 36 is within 10 degrees Fahrenheit of the selected temperature. The PID controller can then command the heating unit(s) to heat for 10 seconds and turn off for 10 seconds until the temperature at the sensor 36 is at the selected temperature. A similar scheme can be used that will allow a selected temperature to be reached asymptotically when cooling a portion of the oven unit 100 from a temperature above the selected temperature. Other embodiments can use other temperature ranges and time sequences as needed for the particular product being produced.

In the illustrated embodiment, the entry of the proofing chamber 112 shown in FIG. 1 also includes a humidifying portion 130 that provides a region where humidified air can be introduced to enhance the process of proofing. The amount of humidity which is introduced can be controlled through feedback by sensing the humidity which is in fact present in chamber 112 and by adjusting the humid air input upward or downward to achieve the desired humidity. The proximity of the opening of the proofing chamber 112 and the humidity portion 130 allows the proofing chamber to receive the humidified air and to maintain the humidity in the chamber within a selected range.

In FIG. 1, the production system 1 includes a humidity controller 32 operatively coupled to a humidity supply source 33 and a humidity sensor 34. In response to the sensed humidity in the humidity portion 130, the controller 32 can deliver more, less, or no humidified air to the humidity portion 130. In selected embodiments, the humidity supply source 33 can provide water vapor for induction into the proofing chamber 112. In other embodiments, the humidity supply source 33 can provide a liquid to the humidity controller 32 and the humidity controller 32 can be configured with a heating element that heats the liquid and produces humidified air (e.g., via an internal heating unit). In still other embodiments, a separate device (e.g., a heater) is used to vaporize liquid from the humidity supply source to provide the humidified air. Although in the illustrated embodiment water vapor is used to increase the humidity in the humidity portion 130, in other embodiments other liquids can be used to increase the gaseous vapors in the humidity portion (e.g., water vapor infused with various essences).

The oven unit 100 also has a cooling chamber 140 positioned adjacent to the downstream end of the baking chamber 116, so that the baking pans 108 and the freshly baked bread (or other baked product) exit the baking chamber and move directly into the cooling chamber. The cooling chamber 140 is configured to allow the loaves in the pans 108 to begin to cool before the loaves are removed from the pans 108. In selected embodiments, the cooling chamber 140 is configured so, as the baking pans 108 and freshly baked bread are traveling through the chamber, condensation forms between the surface of baked bread and the inside surface of the baking pans 108. This condensation helps release the baked bread from the baking pan 108, so the loaf can freely fall from the pans when the baking pans are inverted, as discussed above. Additionally, in selected embodiments the cooling chamber 140 can be configured to control a rate of cooling, for example, prevent the contents of the baking pans 108 from cooling too rapidly. The time each baking pan 108 spends in the humidifying chamber 130, the proofing chamber 112, the baking chamber 116, and the cooling chamber 140 is controlled by the speed at which the pans 108 move and the distance each pan 108 travels through each chamber.

In the illustrated embodiment, the oven unit's inlet 102 is lower than the oven unit's outlet 104. Accordingly, a flow of air from the inlet 102 through the oven unit 100 to the outlet 104 will be produced during operation, thereby creating a natural convective flow of heated air without having to use additional fans or air moving devices. This orientation of the inlet 102 and outlet 104 and the air flow can aid in carrying humidified air from the humidifying portion 130 through the proofing chamber 112 and baking chamber 116. The air flow also helps to even out temperatures in selected areas of the oven unit 100, and/or create convective type heating in the baking chamber 116. Accordingly, the illustrated oven unit 100 arrangement provides improved temperature and humidity control, while maintaining a compact structure. In other embodiments, the oven unit 100 can have other arrangements. For example, in other embodiments the oven unit 100 can include more or fewer chambers.

As best seen in FIG. 1, the system of the illustrated embodiment includes a video display panel 70 mounted on a superstructure 5 that supports other portions of the production system 1. In the illustrated embodiment, video display panel 70 is a 42-inch video play panel, although other display panels could be used. In one embodiment, the production system 1 includes two video display panels 70, one on each side of the production system facing outwardly. These video display panels 70 may be used for various purposes including the display of messages regarding the status of the system, advertising messages, videos (promotional or otherwise), logos, or other images or text. In some situations where the production system 1 is in a retail environment, the video display panels 70 provide an effective advertising tool for the production system 1 and/or for the retail facility. While consumers are viewing the automated bread making process, the video display panel 70 can provide advertising for related or unrelated products or services. In other embodiments, the consumer's attention can be drawn to the production system 1 by the video display panel 70 to encourage the consumer to purchase the baked good produced by the production system 1.

The operation of the various components of the production system 1 can be controlled, coordinated, and/or synchronized in various ways. For example, in selected embodiments a single motor can drive the various conveyors and another motor can drive all of the mixing devices. In other embodiments, multiple motors can drive the various conveyors and mixing devices, and the motors and actuators (e.g., for the dry ingredient metering units and mixing unit doors) can be mechanically coupled together to provide synchronization between various production system components. Additionally, in selected embodiments the various controllers (e.g., the liquid metering unit controller, the humidity controller, and the oven unit temperature controller) can be coupled together electronically to coordinate various production system components.

For purposes of illustration, the following is an example of the operation of the system for baking bread using a recipe for loaves of whole wheat bread. Bags of premixed dry ingredients, e.g., flour, yeast, sugar, salt, spices, milk powder, etc., are emptied into the hopper 12. The dry ingredient metering unit 10 is activated until one of the chambers 26 is aligned with the outlet 14 of the hopper, so that the chamber is filled with approximately 2.9 cups of dry ingredients. The dry ingredient metering unit 10 is activated so the dry ingredients fall from the chamber 26 into the mixing unit 40. The liquid metering unit is activated and approximately 10 ounces of water is also dispensed into the mixing unit 40. The mixing element 46 is then activated for approximately 8 minutes to blend the wet and dry ingredients into a lump of dough. The door 52 of the mixing unit 40 is opened and the mixing element 46 pushes the lump of dough out of the mixing chamber 42, and the dough drops onto the first conveyor 80. As the lump of dough drops, it activates a sensor, such as a photo-optic sensor, positioned under the mixing unit 40, thereby indicating that a lump of dough is on the first conveyor 80.

In one embodiment, the lump of dough is allowed to rest on the first conveyor 80 for a selected period of time (e.g., 4 minutes) before the first conveyor is activated. When the first conveyor 80 is activated, it moves the resting lump of dough toward the second conveyor 84 until another sensor near the end of the first conveyor detects the lump of dough. The first conveyor 80 stops again and allows the dough to continue to rest before moving onto the second conveyor. It is noted that after the first conveyor 80 is activated, the area on the first conveyor 80 under the mixing unit 40 is clear and ready to accept a second lump of dough from the mixing unit. This second lump of dough will rest under the mixing unit 40 while the first lump of dough rests near the end of the first conveyor 80. When the first conveyor 80 is activated again, it moves the first lump of dough onto the second conveyor 84. Accordingly, the first conveyor 80 is moved sequentially in a series of timed starts and stops. In another embodiment, the first conveyor 80 can be moved slowly at a continuous rate so the lump of dough can rest for a sufficient amount of time (e.g. 8 minutes total) before it is delivered to the second conveyor 84 and the dough former 90.

The second conveyor 84 and the dough former 90 are activated when the first conveyor is activated to receive the rested first lump of dough. The lump of dough is moved along the second conveyor 84 and is rolled and formed as it is transported to the end of the second conveyor. The second conveyor 84 and the dough former 90 are configured and timed based upon the timing of the oven conveyor 106. Accordingly, the formed dough is delivered to the end of the second conveyor 84 after a baking pan 108 on the oven conveyor 106 is positioned and waiting at the end of the second conveyor. The oven conveyor 106 can be configured to move continuously at a slow rate, or it can move through a series of sequential steps in a start and stop configuration. In the illustrated embodiment, the oven conveyor 106 is configured to move a selected distance in the sequential steps with approximately a three-minute delay between each step.

The oven conveyor 106 sequentially moves the baking pan 108 with the first lump of dough (and the other baking pans) through the proofing chamber 112 in about 45 minutes, then through the baking chamber 116 (at about 400 degrees F.) in about 40 minutes, and then through the cooling chamber 140 in about 15 minutes. The resulting baked bread is then tipped out of the baking pan 108, and is ready for bagging and/or delivery to an awaiting customer. Accordingly, the process to bake a loaf of whole wheat bread takes approximately 100 minutes. The system 1 of the illustrated embodiment can produce approximately 15 loaves of bread per hour per operating side. The above example, the sequences, timing, temperature, and speeds for a selected bread recipe are provided for purposes of illustration of an embodiment. The system can use other timing, temperatures, and speeds for the same or different recipes.

In the illustrated embodiment, the production system 1 includes a central computing system 1500 (shown in FIGS. 1 and 15) that controls, coordinates, and synchronizes the various production system components. In selected embodiments, the computing system 1500 can include a central processing unit, memory, input devices (e.g., keyboard and pointing devices), output devices (e.g., display devices), and storage devices (e.g., disk drives). The memory and storage devices can include computer-readable media that may contain instructions that implement the system. In addition, the data structures and message structures may be stored or transmitted via a data transmission medium, such as a signal on a communication link. Various communication links may be used, including various networks (e.g., the Internet, a local area network, a wide area network, a point-to-point dial-up connection, a cell phone network, and so on).

Embodiments of the central computing system 1500 may be implemented in various operating environments that include Programmable Logic Controllers (PLC's) personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The system may also be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired among various components of the central computing system 1500. For example, the central computing system 1500 can be coupled to, or include, the various controllers discussed above with reference to various embodiments of the invention.

Figure 15:
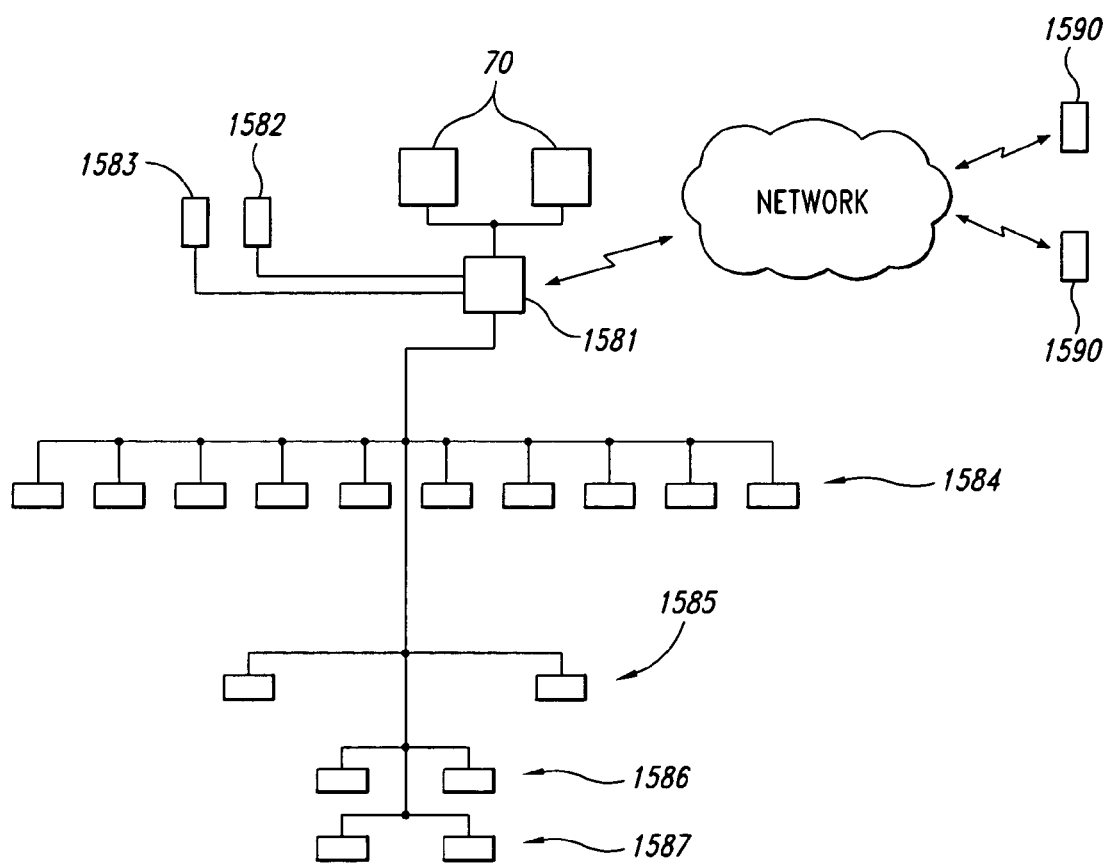
FIG. 15 is a partially schematic illustration of a central computing system of the system shown in FIG. 1.

In FIG. 15, the central computing system 1500 includes a central processor 1581, at least one operator input device 1582, and at least one display device 1583 to allow an operator or user to interface with the central computing system 1500. The central processor can also be operably coupled to the display panels 70, various controllers 1584, various motors 1585, various actuators 1586, and various other components 1587 (e.g., various sensors and/or portions of the processing unit 1400 discussed above). In one embodiment, the video monitors use a separate server, although the computing system 1500 is configured to turn the video monitors on and off. In FIG. 15, the central computing system 1500 is operably couplable to a network so that it can communicate with at least one other computing system 1590. For example, in certain embodiments another computing system 1590 can include a server or personal computer located at a central location and configured to exchange information and/or instructions with other production systems 1 in different locations. Accordingly, a fleet production systems 1 located at different retail locations across a state, the country or the world can be networked to a central computer system that can monitor the performance, production and needs of the entire fleet of production systems. In other embodiments another computing system 1590 can include or be coupled to the stores inventory/sales computer server.

In the illustrated embodiment, in addition to controlling, coordinating, and synchronizing the various components of the production system 1, the central computing system 1500 can also store information and acquire data. For example, the central computing system 1500 can track production and provide information concerning required maintenance, the ordering of supplies, and/or a comparison between the amount of bread produced and sold (e.g., by comparing production to the stores inventory/sales computer server). In still other embodiments, the central computing system 1500 can monitor the time of day that sales increase and decrease and adjust production levels appropriately. For example, during portions of the day when bread sales are relatively slow, the computing system 1500 can reduce bread production (e.g., by producing lumps of dough at a rate so that only every other baking pan is filled).

The operator input device 1582 and display device 1583 can allow an operator to input various instructions to the central computing system 1500 and to monitor the operation of the production system 1. For example, in certain embodiments the operator can start or shutdown the machine via the input device 1582. In other embodiments, the operator can select from multiple bread recipes stored in the central computing system, determine the type of dry element 400 that is needed for a selected recipe, and provide a command to the production system to operate in a selected mode that corresponds to the selected recipe. The operator can then select the appropriate dry ingredients (e.g., a bag of premixed bread making ingredients) and place the dry ingredients into the hoppers. The operator can control the display panels 70 via the input device 1582 and display device 1583. In the illustrated embodiment, bags of premixed and premeasured dry ingredients are provided in accordance with different bread recipes, (e.g., ingredients for enriched white bread, whole wheat bread, multigrain bread, rye bread, or other selected breads). Each bag is configured to make a selected number of loaves of product. Accordingly, the user only needs to select what type of bread/product is needed and how many loaves are needed to determine how many bags of the dry ingredients are needed.

Additionally, the operator can interface/interact with another computing system 1590 using central computing system 1500. For example, the operator can order additional supplies (e.g., dry ingredient) based on the amount of production that has occurred over a selected period of time. The central computing system 1500 can be programmed to automatically order more supplies based on the accumulated production that has occurred. The operator can download recipes, service information, and/or information to be displayed on the display panel 70. The central computing system 1500 can have password protected features that only allow certain personnel to access, change, and/or monitor the protected features.

In selected embodiments, at least one of the other computers 1590 can exchange information with the central computing system 1500. For example, the other computing system 1590 can gather data from one or more central computing systems 1500 of one or more production systems 1 to track trends. Additionally, the other computing system 1590 can download information to the central computing system 1500, including marketing suggestions, recipes, and suggestions for reordering supplies. The other computing system 1590 can be used to control the operation of the production system 1 through the central computing system 1500. The other computing system 1590 can monitor the operation of a production system 1 via the associated central computing system 1500 to insure that only approved dry ingredients and/or approved recipes are being used by the production system 1. For example, the production of the production system 1 can be monitored and compared to the ingredients ordered by the operator of the production system 1 to ensure that non-approved ingredients are not being substituted during the bread production process.

The production system 1 described above also includes a base 3, a frame 4 mounted on the base 3 and the superstructure 5 to support the various features and elements discussed above. These components can be arranged so that they take up a relatively small footprint. For example, in selected embodiments the production system can fit in a floor space that is approximately ten feet long by four feet wide. The production system 1 can be approximately six feet tall to the top of the superstructure 5, and the frame 4 can include an integral step so a user can easily access the top of the hoppers.

In the illustrated embodiment, the production system 1 can be moveable and transportable without the need for disassembly. For example, as shown in FIGS. 1-3, the production system 1 can include one or more lifting devices 145 connected to the base 3. The lifting devices 145 are configured to lift at least a portion of the system 1 so that fork life tines, dollies, or wheel assemblies can be placed under the base 3 to facilitate transport. The lifting devices 145 can be positioned and used as leveling devices so that the orientation of the base 3 and frame 4 can be adjusted and leveled when on an un-level surface. In various embodiments, the lifting devices 145 can include mechanical, hydraulic, pneumatic, and/or electrical components. In other embodiments, the lifting device(s) 145 can have other arrangements. For example, in one embodiment the lifting device(s) 145 can include slots positioned to facilitate the use of a forklift to lift and move the production system 1. In other embodiments, the lifting devices 145 can include one or more wheel assemblies permanently attached to the base 3. The wheel assembly can have a locking device that locks the wheels in a selected position preventing movement and can be un-lockable to allow transport of the system 1.

In other embodiments, the production system 1 can have other arrangements. For example, in other embodiments, the production system 1 can include more or fewer components. For instance, while the present embodiment describes and illustrates a system with two production lines, each production line servicing two dough mixing units, it will be readily understood by those skilled in the art that the system could be reduced to a single production line servicing a single dough mixing unit. In other embodiments, two or more dough mixing units can be serviced by one or more production lines and/or the system 1 can include more than two production lines. In still other embodiments, the production system can be used to produce other food or non-food products. For example, in selected embodiments the production system 1 can be configured to produce cakes. Generally cakes do not require kneading, shaping, or proofing. Accordingly, in these selected embodiments the mixer units can be configured to mix a slurry or mixture of dry ingredients with a liquid and can be provide with a downwardly facing opening to deposit the slurry directly into a baking pan that carries cake mixture through the baking chamber of the oven unit.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Although advantages associated with certain embodiments of the invention have been described in the context of those embodiments, other embodiments may also exhibit such advantages. Additionally, none of the foregoing embodiments need necessarily exhibit such advantages to fall within the scope of the invention. Accordingly, the invention is not limited except as by the appended claims.

I claim:

1. A system for continuous production of baked product, comprising:
  a frame defining a system footprint;
  a dry ingredient metering unit coupled to the frame, the metering unit configured for discharging a succession of metered volumes of dry ingredient, each volume of dry ingredient being used for the production of a batch of dough for a single unit of the baked product, the metering unit including
    a hopper including a hopper inlet for receiving dry ingredient and a hopper outlet for discharging dry ingredient;
    a platform support including a first upper surface and a first opening extending from the first upper surface through the platform support;
    a shaft spaced apart from the hopper, the shaft having a rotational axis; and
    a platform assembly mounted to the shaft and rotatable between the hopper and the platform support, the platform assembly comprising:
      an upper platform having a second upper surface and a second opening extending from the second upper surface through the upper platform;
      a lower platform spaced apart from the upper platform and having a lower surface in slidable communication with the first upper surface of said platform support and a third opening extending from the lower surface through the lower platform; and
      a metering vessel for metering dry ingredient, the metering vessel extending between the upper and lower platforms and through the second opening in the upper platform and the third opening in the lower platform;
    wherein each of the upper platform, the lower platform, and the metering vessel of the platform assembly are rotatable together about the rotational axis of the shaft between a first position where the metering vessel is aligned with the hopper outlet, a second position where the metering vessel is aligned with an inlet of a dough mixing unit, and a third stationary position different from the first and second positions; and
    wherein the third opening of the lower platform is closed by the first upper surface of the platform support when the platform assembly is in the first position, and wherein the hopper outlet is closed by the second upper surface of the upper platform when the platform assembly is in the second position;
  a liquid metering unit coupled to the frame and having a second outlet for discharging a metered amount of liquid for making the single unit of baked product;
  a dough mixing unit coupled to the frame and having the dough mixing inlet, a mixing chamber, and a mixing device in the mixing chamber, the mixing chamber being in communication with the dough mixing inlet and the second outlet, the mixing device configured to mix the volume of dry ingredient with the metered amount of liquid to form a batch of dough for the single unit of baked product;
  a dough transport coupled to the frame and positioned to receive at a receiving portion a succession of the batches of dough discharged from the dough mixing unit and operative to transport the single batches of dough to a discharge portion, wherein the dough transport includes a first conveyor that moves in a first direction and transports the single batches of dough and a second conveyor spaced apart from and positioned above the first conveyor, wherein the second conveyor has an underside bearing surface that moves in a second direction opposite the first direction to bear against and shape the single batches of dough as the single batches of dough move along the first conveyor;
  an oven conveyor coupled to the frame and having a plurality of dough holders spaced apart from each other, each dough holder configured to contain a single batch of dough, the oven conveyor having a portion adjacent to the discharge portion of the dough transport and configured to sequentially move the dough holders through a position to receive a single batch of dough from the discharge portion of the dough transport; and
  an oven unit coupled to the frame and having an oven inlet, an oven outlet, a baking portion, a prebaking portion, and a pathway extending through the prebaking and baking portions, at least a portion of the oven conveyor extending through the oven unit along the pathway, the oven unit having a heat diffuser adjacent to the baking portion to shield at least a portion of the prebaking portion and the dough holders from heat applied to the baking portion, the oven conveyor configured to move the dough holders through the baking portion at a rate so the single batches of dough in the dough holders will be sequentially baked to form the baked products when the dough holders exit the oven unit.

2. The system of claim 1 wherein the prebaking portion is a proofing chamber and the baking portion is a baking chamber.

3. The system of claim 1 wherein the oven unit includes a heating element that provides heat to the baking portion and to the prebaking portion.

4. The system of claim 1 wherein the oven unit includes a heating element intermediate the prebaking and baking portions and a portion of the heat diffuser is positioned between the heating element and the prebaking portion, and a second portion of the heat diffuser is positioned between the heating element and the baking portion.

5. The system of claim 4 wherein the second portion of the heat diffuser is perforated.

6. The system of claim 1 wherein the prebaking chamber is an elongated horizontally oriented proofing chamber and the baking chamber is an elongated horizontally oriented baking chamber extending longitudinally above the proofing chamber.

7. The system of claim 6 wherein the oven unit includes a heating element between the proofing chamber and the baking chamber.

8. The system of claim 1 wherein the hopper includes an anti-bridging assembly that directs at least one flow of air into the hopper generally adjacent to the hopper outlet.

9. The system of claim 1 wherein the metering vessel is a first metering vessel that is configured to receive a first volume of dry ingredient sufficient for use in making a single batch of dough in accordance with a first recipe, and wherein the metering unit further includes a second metering vessel interchangeable with the first metering vessel and configured to receive a second volume of dry ingredient sufficient for use in making a single batch of dough in accordance with a second recipe.

10. The system of claim 1 wherein the metering vessel is a first metering vessel and wherein the metering unit further includes a second metering vessel interchangeable with the first metering vessel and configured to receive dry ingredients sufficient for use in making a single batch of dough, the first and second metering vessels having the same external volume and having different internal volumes.

11. The system of claim 10 wherein the first and second metering vessels are tubular vessels with the same outer diameters and with different inside diameters.

12. The system of claim 1, further comprising a central computing system operably coupled to at least two of the dry ingredient metering units, the liquid metering unit, the dough mixing unit, the dough transport, the oven conveyor, and the oven unit.

13. The system of claim 1, further comprising an adjustable leveling device connected to the frame.

14. A system for continuous production of baked bread, said system comprising:
   a flour metering unit having an inlet for receiving flour and at least one outlet for discharging a succession of metered amounts of said flour, each metered amount of flour so discharged having a volume suitable for the production of a single batch of bread dough, the flour metering unit including
      a hopper comprising the inlet for receiving flour and a hopper outlet for discharging flour;
      a platform support including an opening extending from a flat first upper surface of the platform support to a mixer inlet of a dough mixing unit;
      a shaft spaced apart from the hopper, the shaft having a rotational axis; and
      a platform assembly pivotally mounted to the shaft below the hopper atop the platform support, the platform assembly comprising
         an upper platform having a flat second upper surface;
         a lower platform spaced apart from the upper platform and having a flat lower surface in slidable communication with the first upper surface of the platform support; and
         a chamber for metering flour, the chamber extending between and through the upper and lower platforms from a corresponding upper opening in the second upper surface of the upper platform to a corresponding lower opening in the lower surface of the lower platform;
      wherein each of the upper platform, lower platform and the chamber is pivotable together about the rotational axis of the shaft between a first position where the chamber is aligned with the hopper outlet, a second position where the chamber is aligned with the mixer inlet, and a third stationary position out of alignment with the hopper outlet and the mixer inlet; and
      wherein the lower opening of the first chamber is closed by the first upper surface of the platform support when the platform assembly is in the first position, and wherein the hopper outlet is closed by the upper surface of said upper platform when the platform assembly is in said second position;
   at least one dough mixing unit having the mixer inlet and a mixer outlet, said dough mixing unit for:
      receiving through said mixer inlet a succession of metered amounts of flour discharged from said metering unit;
      mixing and kneading each metered amount of flour so received with a liquid to produce a lump of dough; and
      discharging each lump of dough so produced through said mixer outlet;
   a dough resting and forming unit comprising:
      a first conveyor positioned to automatically receive a succession of lumps of dough discharged from said dough mixing unit and operative to transport the same away from said dough mixing unit to a distal end of said first conveyor;
      a second conveyor positioned to automatically receive said succession of lumps of dough from the distal end of said first conveyor and operative to transport the same away from said first conveyor to a distal end of the second conveyor; and
      a dough former positioned above said second conveyor to operatively bear down upon and form said lumps of dough as said lumps are being transported by said second conveyor, wherein the dough former comprises a continuous belt positioned above the second conveyor, the belt having an underside bearing surface continuously moveable in a direction traveling counter to the direction of movement of the second conveyor while bearing down upon and thereby forming the lumps of dough; and
   an oven unit comprising:
      an oven unit inlet;
      an oven unit outlet; and
      an oven unit conveyor for transporting baking pans located at spaced intervals along said oven unit conveyor through said oven unit from said oven unit inlet to said oven unit outlet, said oven unit conveyor being positioned and said baking pans being spaced along said oven unit conveyor to automatically receive said succession of lumps of dough from the distal end of said second conveyor into discrete ones of said baking pans.

15. The system of claim 14 wherein said oven unit comprises a proofing chamber and a baking chamber.

16. The system of claim 14 wherein said oven unit comprises an elongated horizontally oriented proofing chamber and an elongated horizontally oriented baking chamber, said baking chamber extending longitudinally above said proofing chamber.

17. The system of claim 14, comprising a plurality of said dough mixing units and wherein said metering unit comprises a plurality of outlets, each of said outlets for discharging a succession of metered amounts of flour into an associated one of said dough mixing units.

18. The system of claim 14, further comprising a central computing system operably coupled to at least one of the flour metering unit, the at least one dough mixing unit, the dough resting and forming unit, and the oven unit.

* * * * *